April 21, 1953     H. C. LINDSAY     2,635,486
AUTOMATIC POWER TRANSMISSION SYSTEM Filed Feb. 17, 1950     4 Sheets-Sheet 1

FIG. 1

INVENTOR
Howard C. Lindsay

FIG. 2

INVENTOR
Howard C. Lindsay

April 21, 1953 H. C. LINDSAY 2,635,486
AUTOMATIC POWER TRANSMISSION SYSTEM
Filed Feb. 17, 1950 4 Sheets-Sheet 3

INVENTOR
Howard C. Lindsay

April 21, 1953　　　　H. C. LINDSAY　　　　2,635,486
AUTOMATIC POWER TRANSMISSION SYSTEM
Filed Feb. 17, 1950　　　　　　　　　　　4 Sheets-Sheet 4

INVENTOR
Howard C. Lindsay

Patented Apr. 21, 1953

2,635,486

UNITED STATES PATENT OFFICE 2,635,486

AUTOMATIC POWER TRANSMISSION SYSTEM

Howard C. Lindsay, Paramus, N. J.

Application February 17, 1950, Serial No. 144,625

12 Claims. (Cl. 74—688)

This invention relates to an automatic power transmission system for transmitting rotary power from a drive shaft to a load shaft in either the same or reverse direction and at variable speeds. It is particularly adapted for use in motor vehicles but may also be used in other mechanisms.

It is an object of this invention to provide an automatic power transmission system with improved means for transferring rotary power from a drive shaft to a driven shaft with a multiplicity of speed and power ratios.

Another object is to provide an automatic power transmission system with improved fluid control means for controlling the transference of rotary power from a drive shaft to a load shaft smoothly and automatically through an indeterminate number of power and speed ratios extending from infinity, such as when the load is at rest, to a one-to-one ratio or direct drive.

Still another object is to provide an automatic power transmission system with improved means for transmitting rotary motion from a drive member to a driven member in the same direction and at variable speeds under the control of the driving speed.

An additional object is to provide an automatic power transmission system with improved means for transmitting rotary motion from a driving shaft to a load shaft in the reverse direction and at variable speeds under the control of the driving power and a reverse control means.

A further object is to provide an automatic power transmission system with improved transmitting means for furnishing either forward drive or reverse drive as determined by a single directional control means, the transmitting means being the same in both instances.

Still another object is to provide an automatic power transmission system for transferring driving power to a load with improved means for preventing an excessive load from stalling the driving power or from damaging the transmission system itself under abnormal conditions.

These and other objects of the invention are accomplished by employing an improved combination of gears for mechanically coupling a drive shaft to a load shaft. This mechanical coupling is maintained continuously and the coupling gears are held in mesh constantly without any substitution of one gear for another. The ratio of the transference of speed and power effected by the coupling gears is variably determined by improved fluid control means comprising a plurality of fluid impellers. The fluid impellers are operated in accordance with the applied driving power to transfer rotary motion from the drive shaft to the load shaft through a multiplicity of ratios extending from infinity, such as when the load is at rest, to a one-to-one ratio or direct drive. The direction of the rotary motion transferred from the drive shaft to the load shaft can be reversed under the control of a single reverse control means.

The entire transmission system is immersed in the same fluid that forms a part of the fluid control means and which also serves to lubricate the coupling gears and to reduce noise to a minimum. Since the movement between the coupling gears becomes less as a direct drive condition is approached, there is substantially no rotation of the coupling gears at the time when the load shaft attains the same rotating speed as the drive shaft with the result that there is little wearing of the gear teeth and little noise during operation.

These and other features of the invention are more fully discussed in connection with the follow detailed description of the drawing in which.

Figure 1:
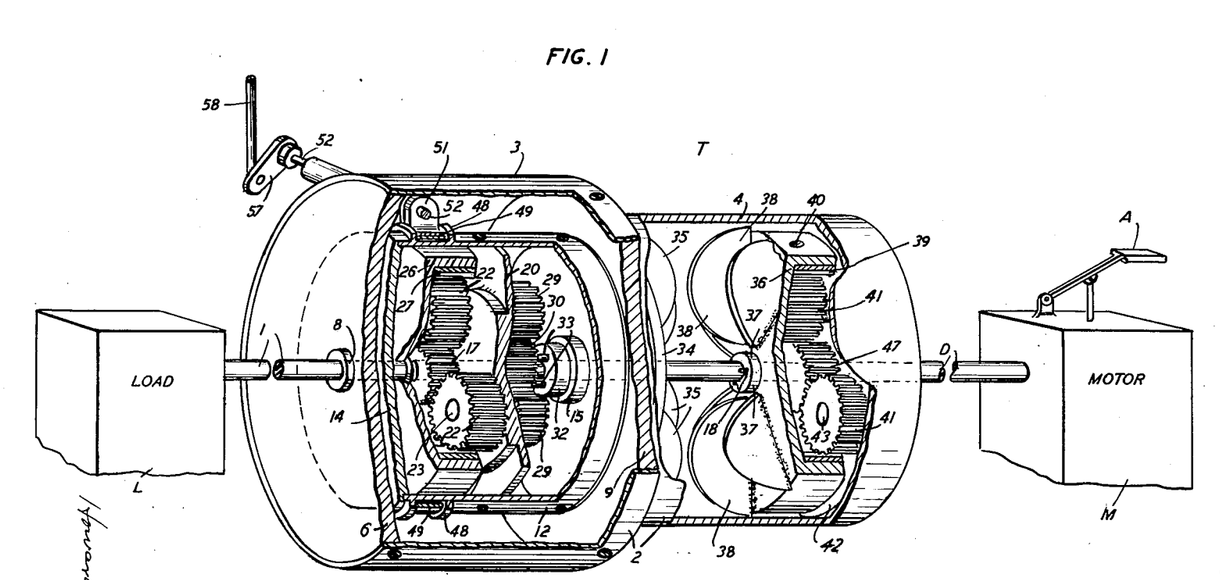
Fig. 1 is a perspective view of the automatic power transmission system.

In Fig. 1, a drive shaft D is mechanically coupled to a load shaft I by an automatic power transmission system T. The driving shaft D is driven by any suitable source of variable driving power, such as a motor M of an automotive vehicle, and its speed of rotation is varied in accordance with variations that are effected in the driving power by means of a conventional accelerator A. The driven shaft I is coupled in any suitable manner to an appropriate load L, such as the driving wheels of an automotive vehicle.

Figure 2:
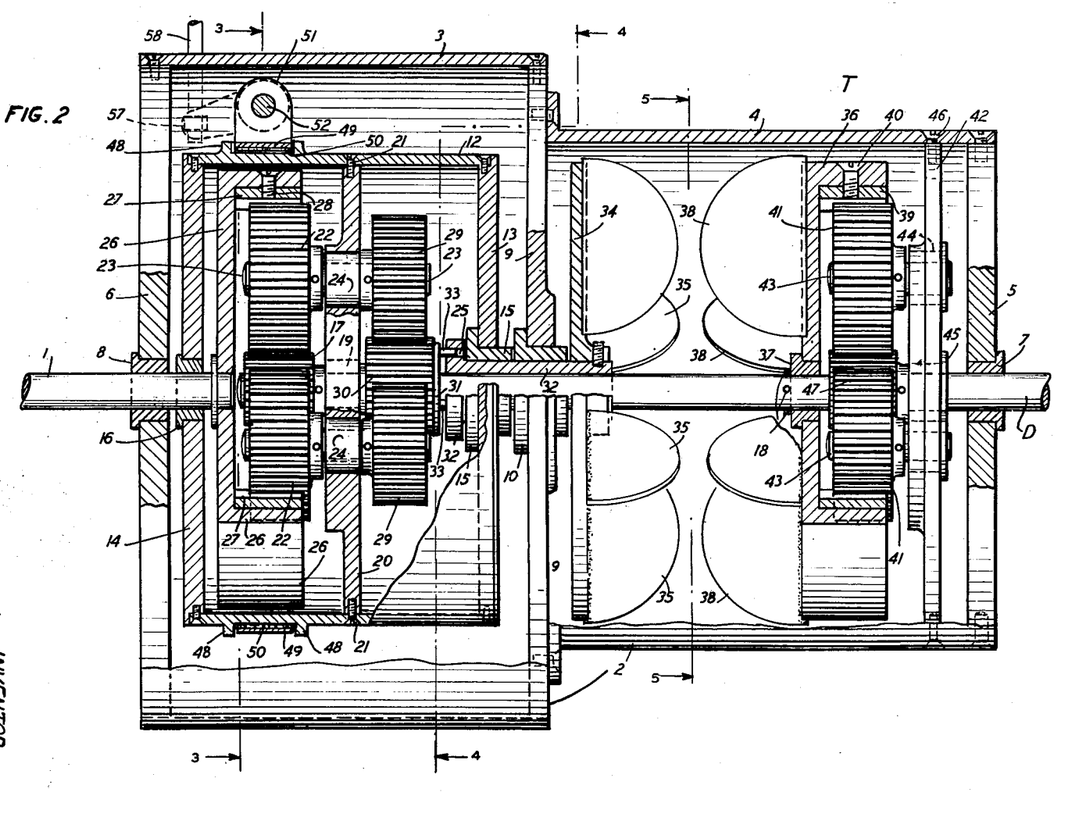
Fig. 2 is a cross-sectional side view of the automatic power transmission system.

As can be seen in Figs. 1 and 2, the automatic power transmission system T is located within an external housing 2 which is fixedly secured to the chassis of the vehicle in any suitable manner. The external housing 2 comprises two cylindrical members 3 and 4 and two end plates 5 and 6. The center of the right end plate 5 is provided with a bushing 7 through which passes the driving member D. Similarly, the center of the left end plate 6 is provided with a bushing 8 through which passes the driven member 1. Thus, the external housing 2 is mounted upon the drive shaft D and the load shaft 1 and encloses end portions of both of these shafts D and 1. The shafts D and 1 are able to rotate through their respective bushings 7 and 8 but the external housing 2 is constantly prevented from rotating due to the fact that it is fixedly secured to the chassis of the vehicle. The external housing 2 is divided into two compartments or chambers by a transverse supporting partition 9 which is suitably secured to both of the cylindrical members 3 and 4. The center of this partition 9 is provided with a relatively large bushing 10 for a purpose that is explained hereinafter.

The left compartment of the external housing 2 surrounds an internal cylindrical case 12 having two end plates 13 and 14. The right end plate 13 is supplied with a relatively large bushing 15 for enabling it to rotate about the drive shaft D. The left end plate 14 is similarly provided with a bushing 16 for enabling it to rotate about the load shaft 1. Thus, the internal case 12 is mounted upon both the drive shaft D and the load shaft 1 and encloses the ends of both of these shafts D and 1. The shafts D and 1 are able to rotate through their respective bushings 15 and 16. It is to be noted that, unlike the external housing 2 which is constantly prevented from rotating, the internal case 12 can be rotated about the shafts D and 1 on the bushings 15 and 16 by means that are described hereinafter.

Within the rotary housing 12, the drive shaft D is continuously coupled to the load shaft 1 by mechanical coupling means constituted by a combination of gears. One of these coupling instrumentalities is a sun gear 17 which is mounted on the extreme left end of the drive shaft D and is fixedly secured thereto in any suitable manner for rotation therewith.

Figure 3:
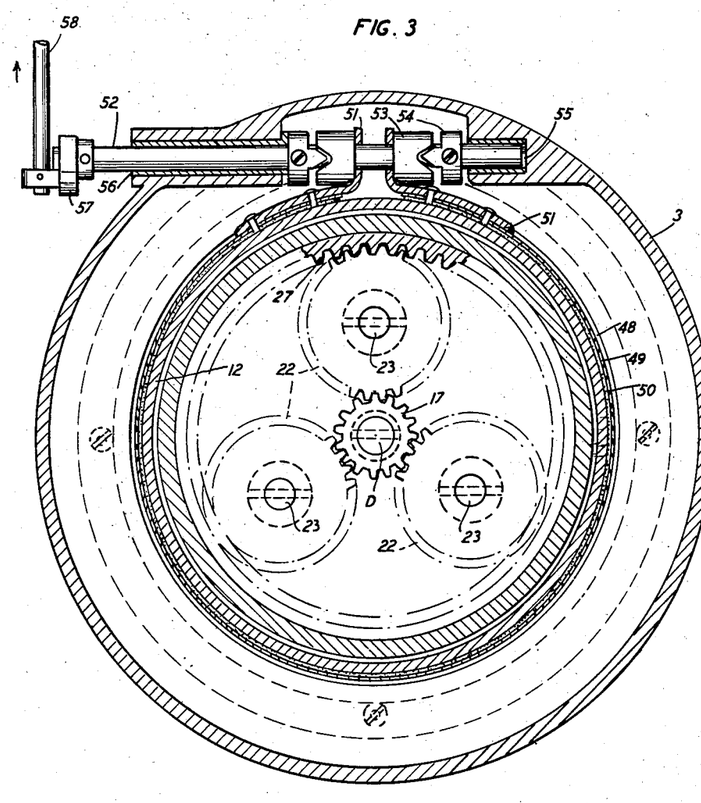
Fig. 3 is a cross-sectional end view taken along the line 3—3 in Fig. 2 and showing the reverse control means and a group of gears which mechanically couple the drive shaft to the load shaft.

Immediately to the right of the sun gear 17 is a gear support plate 20 which is mounted loosely on the drive shaft D by means of a bushing 19 and is secured by screws 21 to the internal case 12 for rotation therewith. A plurality of planetary gears 22 are disposed equidistantly about the left face of the gear support plate 20 and are so constructed and arranged that their teeth mesh with those of the sun gear 17 as is shown in Fig. 3. The planetary gears 22 are mounted upon individual gear shafts 23 and are fixedly secured thereto for rotation therewith. The gear shafts 23 pass loosely through bushings 24 in the gear support plate 20 and extend outwardly from its right face for a purpose that is explained hereinafter.

The load shaft 1 has a coupling instrumentality, constituted by a flanged plate 26, mounted on its extreme right end and fixedly secured thereto in any suitable manner, such as by welding, for rotation therewith. As can be seen in Fig. 2, there is sufficient clearance between the outer surface of the flanged portion of the plate 26 and the inner surface of the rotary housing 12 to permit each to rotate freely and independently of the other. An internal ring gear 27 is fixedly secured by screws 28 to the inner surface of the flanged portion of the plate 26 for rotation therewith. The internal ring gear 27 is so constructed and arranged that its teeth mesh with those of each of the planetary gears 22 as is shown in Fig. 3.

Thus, when driving power is applied to rotate the drive shaft D, the mechanical coupling, constituted by the sun gear 17 and the planetary gears 22 together with the internal ring gear 27 and the flanged plate 26, will tend to effect the rotation of the load shaft 1 in the same direction as that in which the drive shaft D is rotated. However, such rotation of the load shaft 1 will not necessarily be at the same speed at that of the drive shaft D due to the fact that the planetary gears 22 will revolve around the sun gear 17 when the gear support plate 20 rotates about the drive shaft D on its bushing 19 under circumstances which are described hereinafter.

Figure 4:
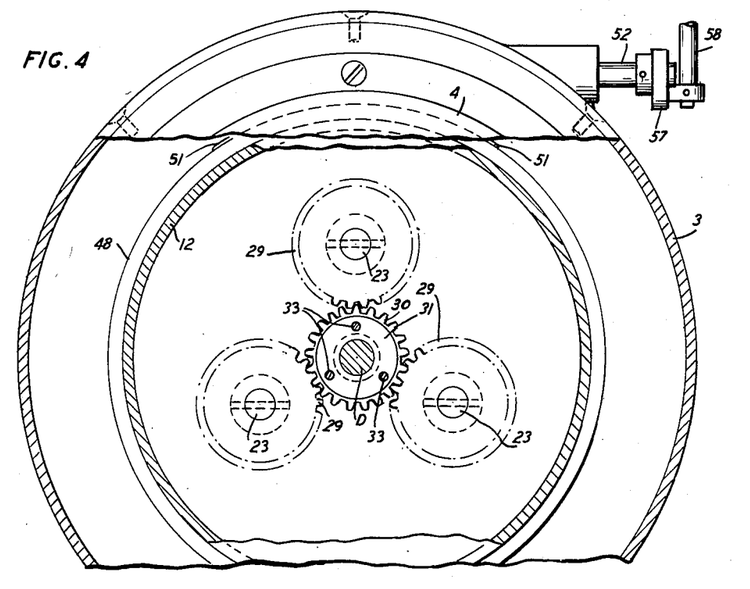
Fig. 4 is a cross-sectional end view taken along the line 4—4 in Fig. 2 and showing a second group of gears.

The rate of rotation of the load shaft 1 is controlled and varied by the automatic power transmission T in a manner that will now be described. As was stated above, the gear shafts 23 extend outwardly from the right face of the gear support plate 20. A second group of planetary gears 29 are mounted upon these extended portions of the gear shafts 23 and are fixedly secured thereto for rotation therewith. Thus, the rotation of a planetary gear on one side of the gear support plate 20 will effect a corresponding rotation of its associated planetary gear on the opposite side of the gear support plate 20. Also located on the right face of the gear support plate 20 is a second sun gear 30 which is securely fastened to a bushing 31 that is mounted loosely on the drive shaft D. The planetary gears 29 in this second group are so constructed and arranged that their teeth mesh with those of the second sun gear 30 as is shown in Fig. 4.

Immediately to the right of the bushing 31 is a relatively long sleeve 32 which is fitted loosely over the drive shaft D. This sleeve 32 passes loosely through the relatively large bushing 15 so as to permit the end plate 13 of the internal case 12 to rotate freely and independently about both the sleeve 32 and the drive shaft D. The adjacent faces of the bushing 31 and the sleeve 32 are enlarged sufficiently to permit the drilling of suitable holes 25 therein for securely receiving the ends of a plurality of coupling pins 33. By being thus securely fastened, the coupling pins 33 serve to couple the sleeve 32 securely to the bushing 31 so that both the members 31 and 32 are fixedly attached to each other to form an integral unit. Since the bushing 31 is securely fastened to the sun gear 30, any rotation of the sun gear 30 will effect a corresponding rotation of the sleeve 32. It is to be understood that the invention is not limited to this specific coupling construction as any other suitable coupling construction known to those skilled in the art may be employed.

As is shown in Fig. 2, the sleeve 32 also passes through the relatively large bushing 10 of the non-rotating supporting partition 9 and extends into the right compartment of the external housing 2. A fluid impeller constituted by a paddle plate 34 having a plurality of radially disposed paddle blades or vanes 35 affixed thereto in any suitable manner is mounted within this compartment upon the extreme right end of the sleeve 32 and is securely fastened thereto for rotation therewith. Thus, any rotation of the sun gear 30 will be transmitted by the sleeve 32 to effect a corresponding rotation of the paddle plate 34.

At this point, it should be noted that the entire space within the external housing 2 is filled with a suitable thin fluid which retains its low viscosity even during extreme temperature changes. Since this fluid fills the internal case 12 and both chambers of the external housing 2, it lubricates the entire transmission system and assists in reducing noise to a minimum.

One of the functions of the fluid is to serve as a means for enabling the rotation of the impeller 34 to be controlled to a certain extent by a second impeller constituted by a flanged paddle plate 36 which is mounted loosely upon the drive shaft D by means of a bushing 37 and is held in place on the drive shaft D by any suitable means, such as a plurality of pins 18 inserted into the drive shaft D and projecting slightly therefrom in front of the bushing 37. As is shown in the drawing, the side of the paddle plate 36 which faces the paddle plate 34 is provided with a plurality of radially disposed paddle blades or vanes 38 affixed thereto in any suitable manner.

Figure 5:
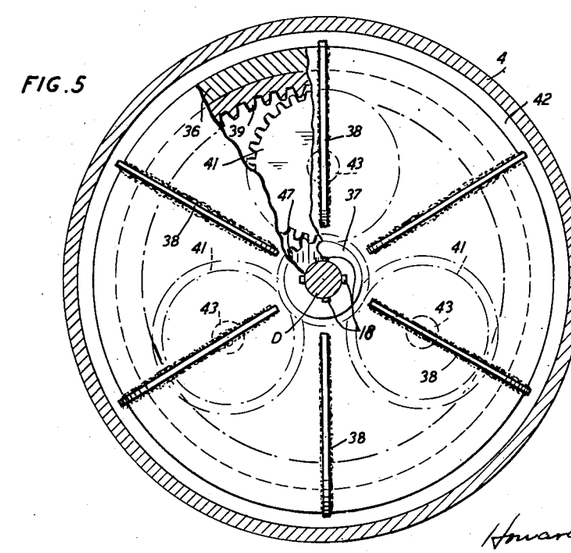
Fig. 5 is a cross-sectional end view taken along the line 5—5 in Fig. 2 and showing one of the fluid impellers and a third group of gears.

The fluid impeller 36 is rotated in a direction opposite to that of the drive shaft D by driving means which include an internal ring gear 39 securely fastened to the paddle plate 36 in any suitable manner, such as by screws 40 passing through both the flanged portion of the paddle plate 36 and the internal ring gear 39 as is shown in Fig. 2. The driving means further comprise a plurality of gears 41 disposed equidistantly about the left face of a non-rotating gear support plate 42 which is secured in any convenient manner, such as by screws 46, to the cylindrical member 4 of the external housing 2. The center of the gear support plate 42 is provided with a bushing 45 through which passes the drive shaft D. The gears 41 are so constructed and arranged that their teeth mesh with those of the internal ring gear 39 as is indicated in Fig. 5. The gears 41 are mounted upon and are fixedly secured to individual gear shafts 43 which pass loosely through bushings 44 in the gear support plate 42. A single gear 47 is mounted on the drive shaft D and is fixedly secured thereto in any suitable manner for rotation therewith. This single gear 47 is so constructed and arranged that its teeth mesh with those of the gears 41 as is indicated in Fig. 5.

When the drive shaft D is rotated slowly by its associated source M of variable driving power, such as when the motor M is running idle, it rotates the gear 47 which, in turn, slowly rotates the gears 41 in the opposite direction. This rotation of the gears 41 drives the internal ring gear 39 in the same direction; that is, opposite to the direction in which the drive shaft D is rotating. Since the internal ring gear 39 is securely fastened to the paddle plate 36, as was described above, the paddle plate 36 will also be rotated slowly in a direction opposite to that of the drive shaft D and will agitate the surrounding fluid.

At the same time, the drive shaft D will slowly rotate the sun gear 17 secured thereto which, in turn, will cause the planetary gears 22 and their gear shafts 23 to rotate slowly in a direction opposite to that in which the drive shaft D is rotating. When there is a load L on the load shaft 1, the inertia of the load L will be applied through the medium of the flanged plate 26 to prevent the internal ring gear 27 from being rotated by the planetary gears 22 at this time. Consequently, the planetary gears 22 will be forced to "walk" around within the internal ring gear 27 in the same direction as that in which the drive shaft D is rotating and they will carry with them the gear support plate 20. Since the gear support plate 20 is securely attached to the internal case 12, the internal case 12 will also be slowly rotated at this time in the same direction as that in which the drive shaft D is rotating.

During this time, the planetary gears 29, which are fixedly secured to the same gear shafts 23 as the planetary gears 22, will both rotate and revolve in the same manner as the planetary gears 22. This rotation of the planetary gears 29 will cause their associated sun gear 30, which is mounted loosely upon the drive shaft D by means of the bushing 31, to be rotated in the same direction as the drive shaft D. This rotary motion of the sun gear 30 is transmitted to the paddle plate 34 by the coupling means constituted by the pins 33 and the sleeve 32. Consequently, the impeller 34 will also rotate in the same direction as the drive shaft D and will agitate the surrounding fluid.

Thus, when the motor M is idling and turning the drive shaft D slowly, the impellers 34 and 36 will be rotated slowly in opposite directions. Due to the slow speed at which the impellers 34 and 36 are now rotating, the resulting mild agitation of the fluid accomplishes no useful purpose at this time and the load shaft 1 is not rotated.

When it is desired to rotate the load shaft 1, the accelerator A is depressed to increase the speed of the motor M thereby increasing the rate of rotation of the drive shaft D which increases the speed of rotation of both of the impellers 34 and 36. The resulting increased agitation of the fluid tends to exert a retarding torque upon the rotation of the paddles plates 34 and 36. Since the gear support plate 42 is fixedly secured to the external case 2 which, as was stated above, is constantly held from rotating, the retarding influence of the fluid will have no noticeable effect upon the rotation of the paddle plate 36. However, since the gear support plate 20 is fixedly secured to the internal case 12 which is rotatable and which, in fact, is already rotating as was described above, the retarding effect of the fluid will consequently decrease the speed of rotation of the paddle plate 34. This is due to the fact that the retarding torque produced by the fluid upon the paddle plate 34 is transmitted by the coupling means, constituted by the pins 33 and the sleeve 32, to the sun gear 30 which, in turn, exerts a corresponding retarding torque upon the movement of the two groups of planetary gears 22 and 29 thereby causing them to rotate more slowly on their gear shafts 23 and, at the same time by way of compensation, compelling them to revolve faster around their sun gears 17 and 30 carrying with them the gear support plate 20 and the internal case 12.

As the retarding torque which is now applied to the planetary gears 22 and 29 is in opposition to the driving torque exerted by the sun gear 17 which is being rotated by the drive shaft D, a point will soon be reached, due to the rotating speed of the driving force being progressively increased, at which the internal ring gear 27 will be forced to rotate in the same direction as that in which the planetary gears 22 and 29 are revolving. In other words, with the rotation of the planetary gears 22 being retarded, the driving force exerted by the sun gear 17 will be transmitted through the planetary gears 22 to the internal ring gear 27 thus causing the internal ring gear 27 to rotate. This rotary motion of the internal ring gear 27 is transmitted by the flanged plate 26 to the load shaft 1 which now begins to turn against the inertia of the load L in the same direction as that in which the drive shaft D is rotating.

When the rotating speed of the driving force is increased still further, the fluid will be more forcibly agitated and will exert a correspondingly greater retarding torque upon the paddle plate 34. This increased retarding torque is transmitted along the sleeve 32 to the sun gear 30 and causes a further reduction in the speed at which the planetary gears 22 and 29 rotate about their gear shafts 23. At the same time, the increased speed of the sun gear 17 causes the planetary gears 22 to revolve faster around the sun gear 17 carrying with them the rotary housing 12 and driving the internal ring gear 27 faster. The result of this action is that the turning effect exerted on the load shaft 1 by the internal ring gear 27 and the flanged plate 26 becomes still greater. Thus, the fluid control means, which comprise the impellers 34 and 36, automatically controls the ratio of the power transmitted from the drive shaft D to the load shaft 1. Consequently, when the speed of rotation of the planetary gears 22 and 29 is progressively decreased by the retarding effect of the fluid, more direct turning force is applied to the load shaft 1 and its associated load L.

This action will continue progressively until finally the retarding influence exerted by the fluid will be so great that it will completely prevent the planetary gears 22 and 29 from rotating on their gear shafts 23. With the planetary gears 22 and 29 thus held from rotating, they will be forced to revolve around their sun gears 17 and 30 at the same speed as the drive shaft D. When this point is reached, the paddle plate 34, the internal case 12, the internal ring gear 27, the flanged plate 26, and the load shaft 1 will all be rotating in the same direction and at the same speed as the drive shaft D. In other words, the transmission system T will now be operating on a direct drive basis; that is, there will now be a one-to-one ratio between the rotating speed of the load shaft 1 and the rotating speed of the drive shaft D. With the automatic power transmission system T in this condition, any further increase in the rotating speed of the driving force will automatically produce a corresponding increase in the turning speed of the load L.

With the automatic power transmission system T thus turning the load L at the same speed as the drive shaft D, any reduction in the rotating speed of the driving force will produce a corresponding reduction in the speed of rotation of the impeller 36. This will reduce the retarding torque produced by the fluid on the paddle plate 34 with the result that the retarding torque applied to the planetary gears 29 is correspondingly reduced. However, the load L will now attempt, due to its inertia, to turn faster than the present reduced speed of the drive shaft D and will thereby cause the internal ring gear 27 to compel the planetary gears 22 to rotate on their gear shafts 23 in the same direction as that in which the internal ring gear 27 is rotating. Thus, the planetary gears 22 will now be forced to "walk" around the now slower turning sun gear 17 in the same direction as that in which the drive shaft D is rotating. A result of this action is that the gear support plate 20 and the internal case 12 will continue to rotate in the same direction as the drive shaft D but at a faster speed.

Another result of the above-mentioned action is that, due to the coupling provided by the gear shafts 23, the planetary gears 29 will now move in the same manner as the planetary gears 22. This movement of the planetary gears 29 will not change the direction of rotation of the sun gear 30 and its associated paddle plate 34 due to the increased speed of rotation of the rotary housing 12 but it will increase their speed of rotation which, in turn, will cause the fluid to be more forcibly agitated by the paddle plate 34. The resulting increased retarding torque produced by the fluid will now be immediately applied to the planetary gears 29 to retard their rotation about their gear shafts 23. Since the planetary gears 29 are coupled by the gear shafts 23 to the planetary gears 22, the planetary gears 22 will be similarly retarded from rotating and will thereby exert a braking action upon the rotation of the internal ring gear 27. This braking action together with the loss of momentum of the load L will automatically reduce the rotating speed of the load shaft 1 to the same rotating speed as the drive shaft D thereby preventing the load L from coasting.

Any increase in the turning speed of the load L, such as that which might occur when the vehicle is going down a declivity, is automatically reduced in a similar manner by the above-mentioned braking action exerted by the planetary gears 22 upon the internal ring gear 27.

Any decrease in the turning speed of load L, such as that which might be produced by the vehicle ascending an acclivity or by an increase in the weight of the load L, will produce a corresponding reduction in the speed of rotation of the internal ring gear 27. Since the rotating speed of the drive shaft D will now be greater than the present reduced rotating speed of the internal ring gear 27, the sun gear 17 will now compel the planetary gears 22 to rotate on their gear shafts 23 in a direction opposite to that in which the internal ring gear 27 is rotating. Thus, the planetary gears 22 will now be forced to "walk" around within the internal ring gear 27 in the same direction as that in which the drive shaft D is rotating. A result of this action is that the gear support plate 20 and the internal case 12 will now continue to rotate in the same direction as the drive shaft D but at a slower speed.

Another result of the above-mentioned action is that, due to the coupling provided by the gear shafts 23, the planetary gears 29 will now move in the same manner as the planetary gears 22. This movement of the planetary gears 29 will accordingly reduce the speed of rotation of the sun gear 30 and its associated paddle plate 34. Consequently, the fluid will now be less forcibly agitated by the paddle plate 34 and its retarding effect upon the planetary gears 22 and 29 will be correspondingly decreased. This decrease in the retarding effect of the fluid will permit the planetary gears 22 and 29 to increase their speed of rotation about the gear shafts 23 with the result that less power will now be transferred from the drive shaft D to the load shaft 1.

Under these conditions, if the turning speed of the load L is progressively decreased and if the rotating speed of the drive shaft D is maintained constant, then the transference of power from the drive shaft D to the load shaft 1 will be progressively reduced and a point will finally be reached at which the load shaft 1 will cease to turn. It is to be noted that this will not produce a stalling effect on the driving power due to the cushioning ability of the fluid. Even if the factor which produces the decrease in the turning speed of the load L should suddenly become so great as to stop abruptly the rotation of the internal ring gear 27, no damage would result to the transmission system T due to the fact that the fluid, which is not a rigid coupling, would absorb the sudden shock.

If, under the above-mentioned conditions, the rotating speed of the driving force is progressively increased, the impellers 34 and 36 will be rotated at a faster speed to agitate the fluid more forcibly thereby increasing its retarding effect. With the retarding effect of the fluid being thus progressively increased, the speed of rotation of the planetary gears 22 and 29 will be correspondingly decreased. Thus, the fluid control means, which comprises the impellers 34 and 36, will regulate the ratio of the transference of power and will now cause more power to be transmitted from the sun gear 17 through the planetary gears 22 to the internal ring gear 27 thereby automatically effecting the rotation of the load shaft 1 in the same manner as that described above for starting from an idle condition.

Figure 6:
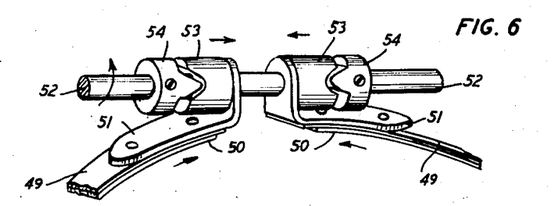
Fig. 6 is a fragmentary view of a portion of the reverse control means.

In order to reverse the direction of rotation of the load shaft 1, such as for the purpose of driving the automotive vehicle backward, the automatic power transmission system T is provided with reverse control means comprising a brake drum 48 machined on the external cylindrical surface of the rotary housing 12 for holding a brake band 49. This brake band 49 is made in the form of a thin metallic band and is supplied with an inner friction lining 50 of any suitable material. Two brackets 51, 51 are secured by any convenient means, such as by riveting, to the ends of the brake band 49. The brackets 51 are provided with holes through which passes a brake rod 52. Next to each bracket 51 is a concave camming device 53 mounted loosely upon the brake rod 52. Two convex camming devices 54 are fixedly mounted upon the brake rod 52 for rotation therewith, each of the devices 54 being so mounted as to engage its associated concave camming device 53 as is shown in Figs. 3 and 6. One end of the brake rod 52 is loosely supported in a socket 55, shown in Fig. 3, on the inner surface of the cylindrical member 3 of the external housing 2. The other end of the brake rod 52 extends outside the cylindrical member 3 of the external housing 2, leakage of the fluid being prevented by a suitable bushing 56, shown in Fig. 3. Affixed to the external end of the brake rod 52 is an operating cam 57, which is best seen in Fig. 1, having an operating rod 58 attached thereto. The operating rod 58 extends upward through the chassis of the vehicle and is so constructed and arranged as to be actuated by any convenient means, such as a foot pedal which has been omitted from the drawing for the sake of simplicity.

For forward driving, the camming devices 53 and 54 are not operated and the brake band 49 is permitted to fit loosely around the brake drum 48 so as to allow the internal case 12 to rotate freely.

For reverse driving, the operating rod 58 is actuated by any convenient means, such as the foot pedal mentioned above, and causes the operating cam 57 to turn the brake rod 52 and the convex camming devices 54 that are fixedly mounted thereon. The resulting camming action produced by the turning of the convex camming devices 54 forces each of the concave camming devices 53 against their associated brackets 51. This action squeezes the brackets 51 toward each other thereby tightening the brake band 49 around the brake drum 48.

When the brake band 49 is thus tightened, the rotary housing 12 will be fixedly held and will be prevented from rotating. Since the gear support plate 20 is fixedly secured to the internal case 12, it too will be held stationary thereby preventing the planetary gears 22 from revolving around the sun gear 17 and the drive shaft D at this time. Consequently, the planetary gears 22 will now force the internal ring gear 27, which is coupled to the load shaft 1, to rotate in a direction opposite to that in which the drive shaft D is rotating.

This can be understood by referring to Fig. 3 and by assuming that the drive shaft D is rotating counter-clockwise. Under this condition, the sun gear 17 will force the planetary gears 22 to rotate on their gear shafts 23 in a clockwise direction. Since the gear support plate 20 and the rotary housing 12 are now being held stationary by the brake band 49 and since the driving force transmitted directly from the sun gear 17 through the planetary gears 22 to the internal ring gear 27 is greater than the retarding torque of the fluid, the internal ring gear 27 will be forced to rotate in a clockwise direction which is the opposite of the direction in which the drive shaft D is turning. Due to the fact that the internal ring gear 27 is fixedly coupled to the load shaft 1 by the flanged plate 26, the load shaft 1 will likewise be forced to rotate in a direction opposite to that in which the drive shaft D is turning thereby reversing the direction in which the load L is turned. With the load L now being driven in the reverse direction, any change in the rotating speed of the drive shaft D will automatically produce a corresponding change in the turning speed of the load L.

Thus, for either forward driving or for reverse driving, the turning speed of the load L is automatically regulated by the automatic power transmission system T in accordance with variations that are effected in the driving power by means of the accelerator A. Except for the accelerator A, the sole control means that is required to be actuated by an operator of the vehicle is the operating rod 58 for effecting a reversal in the direction of the rotation of the load shaft 1.

The specific construction described above and shown in the drawing represents an embodiment of the invention which has been presented for the purpose of explaining and illustrating the principles and features of operation of the invention. It is to be understood that the invention is not to be restricted to this specific embodiment as various modifications in the construction of the automatic power transmission system T may be made without departing from the scope of the invention which is to be limited only by the claims appended hereto.

What is claimed is:

1. In combination, a rotating drive shaft, a rotatable load shaft, and a transmission system for transferring rotary motion from the drive shaft to the load shaft and comprising a rotary housing containing an independently rotatable internal ring gear fixedly coupled to the load shaft for rotation therewith, a first group of planetary gears carried by said rotary housing for rotation therewith and for cooperating with said internal ring gear, a first sun gear rigidly secured to the drive shaft for rotation therewith and for driving said first group of planetary gears, a second group of planetary gears carried by said rotary housing for rotation therewith and fixedly coupled to the first group of planetary gears for rotation therewith, a second sun gear loosely mounted on the drive shaft for cooperating with the second group of planetary gears, a chamber containing a fluid medium, first and second fluid impellers rotatably mounted inside said chamber and immersed in said fluid medium, said second impeller being loosely mounted on said drive shaft for rotation thereabout for agitating said fluid medium, holding means for limiting longitudinal movement of said second impeller along the axis of said drive shaft, first driving means coupled to said second sun gear for rotating said first impeller in the same direction as that in which the drive shaft is rotating, and second driving means for rotating said loosely mounted second impeller.

2. The combination recited in claim 1 wherein said rotary housing encloses both an end of the drive shaft and an end of the load shaft, a non-rotatable housing for enclosing said rotary housing, and instrumentalities for fixedly securing said fluid chamber to said non-rotatable housing.

3. The combination recited in claim 1 wherein said second driving means include members actuated by said drive shaft for positively driving the second impeller in the opposite direction as that in which the drive shaft is rotating for producing a retarding torque of said fluid medium on both said first impeller and said second sun gear for retarding the rotation of both groups of planetary gears whereby the driving force exerted by said first sun gear is applied directly through said first group of planetary gears to said internal ring gear for effecting its rotation together with said load shaft in the same direction as that in which the drive shaft is rotating.

4. A combination in accordance with claim 3 wherein said members comprise a second internal ring gear fixedly coupled to said second impeller for rotation therewith, a single gear rigidly secured to the drive shaft for rotation therewith, and a plurality of gears mounted for engagement with both said single gear and said second internal ring gear for transmitting the driving force exerted by said single gear to said second internal ring gear.

5. A combination in accordance with claim 1 and having reverse control means for effecting the rotation of the load shaft in a direction opposite to that in which the drive shaft is rotating, said reverse control means comprising mechanical means for directly holding said rotary housing from rotation and for indirectly holding said first group of planetary gears from revolving around said first sun gear whereby the driving force exterted by said first sun gear is applied directly through said first group of planetary gears to said internal ring gear for effecting its rotation together with said load shaft in a direction opposite to that in which the drive shaft is rotating.

6. A combination in accordance with claim 1 and having supporting means fixedly attached to said rotary housing in the interior thereof for rotation therewith, a plurality of gear shafts carried by said supporting means, each gear in said first group of planetary gears being secured to an individual one of said gear shafts whereby the revolution of said first planetary gears about said first sun gear is imparted through said supporting means to said rotary housing for rotation thereof.

7. A combination in accordance with claim 1 and having a plurality of gear shafts, each gear in said first group of planetary gears being fixedly secured to one end of an individual one of said gear shafts, each gear in said second group of planetary gears being fixedly secured to an opposite end of a corresponding one of said gear shafts, and supporting means fixedly attached to said rotary housing for rotation therewith and for loosely supporting each of said gear shafts for rotation independently of the rotation of said supporting means and for limiting the revolution of said gear shafts about said first sun gear to periods when said rotary housing and said supporting means are rotating.

8. A combination in accordance with claim 7 and having reverse control means for effecting the rotation of the load shaft in a direction opposite to that in which the drive shaft is rotating, said reverse control means comprising mechanical means for holding said rotary housing and said gear supporting means from rotation whereby the movement of each of said gear shafts is limited solely to rotation around its axis.

9. A combination in accordance with claim 7 wherein said second driving means include members actuated by said drive shaft for positively driving the second impeller in the opposite direction as that in which the drive shaft is rotating for producing a retarding torque of said fluid medium on both said first impeller and said second sun gear for retarding the rotation of both groups of planetary gears and for limiting their movement to revolution around said first and second sun gears.

10. In combination, a rotating drive shaft, a rotatable load shaft, and a power transmission system for transmitting rotary power from the drive shaft to the load shaft and comprising a fixed housing containing a rotary housing, an internal ring gear inside said rotary housing and rigidly coupled to the load shaft for rotation therewith, a first group of planetary gears carried by said rotary housing for engagement with said internal ring gear, a first sun gear rigidly secured to the drive shaft for revolving and rotating said first group of planetary gears, a second group of planetary gears carried by said rotary housing and fixedly coupled to said first group of planetary gears for movement therewith, a second sun gear loosely carried by the drive shaft for engagement with the second group of planetary gears, a chamber containing a fluid medium, first and second rotatable fluid impellers inside said chamber, first driving means coupled to said second sun gear for rotating said first impeller in the same direction as the drive shaft, second driving means actuated by the drive shaft for positively rotating the second impeller in the opposite direction whereby said fluid medium produces a retarding torque on both said first impeller and said second sun gear for retarding the rotation of both groups of planetary gears for forcing said first group of planetary gears to revolve and to transfer rotary power from the drive shaft to the internal ring gear and the load shaft.

11. A combination in accordance with claim 10 and having reverse control means for effecting the rotation of the load shaft in the direction opposite to the rotation of the drive shaft, said reverse control means comprising a brake drum within said fixed housing and positioned around said rotary housing, a brake band around said drum, and operating means positioned internally within said fixed housing and connected with said band, said operating means having a portion projecting externally of said fixed housing to be operable for tightening said band for holding said rotary housing from rotation whereby said first group of planetary gears are held from revolving around said first sun gear and are forced by the first sun gear to rotate in a direction opposite to that of the drive shaft and to transfer this oppositely directed rotation to the internal ring gear and the load shaft.

12. In combination, a drive shaft, a load shaft, and a power transmission system for transmitting power from the drive shaft to the load shaft, said power transmission system comprising a fluid container mounted upon and enclosing both an end portion of said drive shaft and an end portion of said load shaft, a first fluid impeller rotatably mounted upon said enclosed end portion of the drive shaft, a first internal ring gear fixedly secured to said first impeller, a single gear fixedly secured to said enclosed end portion of the drive shaft, a plurality of gears mounted for coaction with both said single gear and said first internal ring gear, a second internal ring gear fixedly secured to said enclosed end portion of the load shaft, a first sun gear fixedly secured to said end portion of the drive shaft, a gear support plate rotatably mounted upon said end portion of the drive shaft, a first plurality of planetary gears rotatably mounted upon one side of said gear support plate for coaction with both said first sun gear and said second internal ring gear, a second plurality of planetary gears mounted on the other side of said gear support plate for rotation conjointly with said first plurality of planetary gears, a second sun gear rotatably mounted upon said end portion of the drive shaft and adapted to be driven by said second plurality of planetary gears, a second fluid impeller rotatably mounted upon said end portion of the drive shaft in conjugate relation to said first impeller, and coupling means for securely coupling said second impeller to said second sun gear for rotation therewith.

HOWARD C. LINDSAY.

References Cited in the file of this patent

UNITED STATES PATENTS

| Number | Name | Date |
|---|---|---|
| 1,962,972 | Stock | June 12, 1934 |
| 2,021,526 | Stock | Nov. 18, 1935 |
| 2,144,256 | Duffield | Jan. 17, 1939 |
| 2,319,706 | Reit | May 18, 1943 |
| 2,329,733 | Watson | Sept. 21, 1943 |
| 2,366,063 | Seybold | Dec. 26, 1944 |
| 2,416,311 | Hanson | Feb. 25, 1947 |
| 2,431,318 | Ellis | Nov. 25, 1947 |
| 2,460,081 | Goodchild | Jan. 25, 1949 |
| 2,543,878 | Stewart | Mar. 6, 1951 |